United States Patent Office 3,033,883
Patented May 8, 1962

3,033,883
2,6-BIS(2-HYDROXY-1-NAPHTHYLMETHYL) 4-ALKYLPHENOLS AND THEIR USE AS ANTIOXIDANTS FOR FATS
Pliny O. Tawney, Passaic, N.J., and John W. Sargent, Naugatuck, Conn., assignors to United States Rubber Company, New York, N.Y., a corporation of New Jersey
No Drawing. Filed Feb. 5, 1959, Ser. No. 791,273
12 Claims. (Cl. 260—398.5)

This invention relates to a new class of compounds, the 2,6-bis-(2-hydroxy-1-naphthylmethyl)-4-alkylphenols, and to their use as antioxidants for fats.

These new compounds are made by the interaction of beta-naphthol and 2,6-dimethylol-4-alkylphenols, the latter being known compounds. A typical preparation is as follows, all parts and percentages being by weight:

A mixture of 52.5 parts of 2,6-dimethylol-4-tert-butylphenol, 95 parts of beta-naphthol, one part of p-toluenesulfonic acid, and 1200 parts of benzene is heated under reflux with a water trap for three hours. During this time the reagents gradually dissolve as the reaction proceeds, and the product crystallizes from the hot benzene. The mixture is cooled to room temperature and filtered. The slightly sticky solid, 2,6-bis(2-hydroxy-1-naphthylmethyl)-4-tert-butylphenol, is dissolved in methanol and reprecipitated by pouring the methanol solution into water. The yield is 63 parts, or 52% of theory; melting point 226–8° C. with decomposition, after recrystallization from toluene.

*Analysis*

|  | Calcd. for $C_{32}H_{30}O_3$, percent | Found, percent |
| --- | --- | --- |
| Carbon | 83.1 | 82.6 |
| Hydrogen | 6.5 | 6.4 |
| Hydroxyl | 11.04 | 11.02 |

2,6-bis(2-hydroxy-1-naphthylmethyl)-4-methylphenol is made similarly. It melts at 224–6° C. with decomposition, after recrystallization from xylene.

*Analysis*

|  | Calcd. for $C_{29}H_{24}O$, percent | Found, percent |
| --- | --- | --- |
| Carbon | 82.8 | 83.3 |
| Hydrogen | 5.8 | 6.0 |

Other new compounds of this invention which can be made by this method are those wherein the 4-alkyl group is ethyl, isopropyl, tert-tert-octyl, etc. Preferred compounds are those in which the 4-alkyl group is a lower alkyl, that is, an alkyl containing 10 carbon atoms or less, although longer alkyl groups, e.g., containing 20 carbon atoms, may be used.

These new phenols are useful as antioxidants for fats (see Hackh's Chemical Dictionary—Grant, 3rd edition, 1944, page 332 wherein fats are defined as greasy or oily substances) in which category we include animal and vegetable oils and fats, particularly those fatty substances which contain a substantial amount of olefinic unsaturation characterized by a Wijs number of at least about 20. Typical fats which can be protected against oxygen by the method of this invention are butter fat, castor oil, corn oil, cottonseed oil, herring oil, lard, linseed oil, menhaden oil, neatsfoot oil, olive oil, oiticica oil, palm oil, peanut oil, perilla oil, rapeseed oil, safflower oil, sardine oil, sesame oil, soybean oil, sperm oil, tall oil, tallow, tung oil, and whale oil, and the same oils partly hydrogenated.

The phenols of the invention may similarly be used as antioxidants for compositions containing fats, such as animal feeds containing an appreciable proportion of edible fatty material.

The degree to which a material protects a fat against air-oxidation is found by comparing the time needed for the peroxide number (defined below) of the fat to rise to an arbitrary value under controlled heating in the presence and absence of the material being evaluated. In the particular tests to be shown below, high grade tallow which had a peroxide number of 2 before treatment was used, but the test method is applicable to any fat which can be protected by the method of this invention. By definition, the test is ended when the peroxide number has risen to 20; i.e., when the fat is considered rancid. (The fat should have a peroxide number below 5 at the beginning of the test.) The peroxide test is carried out as follows:

(1) To a solution of 5 g. of fat in 30 ml. of a mixture of 60% (by weight) of acetic acid and 40% of chloroform is added 0.5 ml. of a starch iodide solution.[1] The solution is shaken until it becomes clear, left for two minutes, diluted with 30 ml. of water, and then titrated for free iodine with 0.01-N sodium thiosulfate while shaking vigorously. The peroxide number per 1000 grams of fat equals $$\frac{ml \times N \times 1000}{g. \text{ of fat in sample}}$$

where ml. is the volume consumed and N is the normality, of the thiosulfate solution.

The test to determine the efficacy of a material as an antioxidant is carried out as follows: The fresh fat, 150 g., is warmed in a 6-inch Petri dish overnight in an oven at 80° C. Then 0.15 g. of the chemical to be tested is stirred into the melted fat. This mixture and a control sample of the same fat alone are heated in the oven at 80° C. At weekly intervals a five-gram sample of each is removed for peroxide analysis as described above. The control usually becomes rancid, i.e., has a peroxide number of at least 20, within two or three weeks. The fat which is protected by 2,6-bis-(2-hydroxy-1-naphthylmethyl)-4-tert-butylphenol withstands from four to seven weeks heating before the peroxide number reaches 20, while the fat which is protected by 2,6-bis-(2-hydroxy-1-naphthylmethyl)-4-methylphenol withstands seven weeks heating. These examples show that the new compounds of this invention are useful in protecting fats against air-oxidation.

Having thus described our invention, what we claim and desire to protect by Letters Patent is:

1. 2,6-bis-(2-hydroxy-1-naphthylmethyl)-4-alkylphenols, in which the alkyl group contains not more than 20 carbon atoms.

2. 2,6-bis-(2-hydroxy-1-naphthylmethyl)-4-alkylphenols, in which the alkyl group is a lower alkyl group.

3. 2,6-bis-(2-hydroxy-1-naphthylmethyl) - 4 - tert-butylphenol.

4. 2,6-bis-(2-hydroxy-1-naphthylmethyl) - 4 - methylphenol.

5. A composition comprising a fat and, as an antioxidant for said fat, a 2,6-bis-(2-hydroxy-1-naphthylmethyl)-4-alkylphenol, in which the alkyl group contains not more than 20 carbon atoms.

6. A composition comprising a fat and, as an antioxidant for said fat, a 2,6-bis-(2-hydroxy-1-naphthylmethyl)-4-alkylphenol, in which the alkyl group is a lower alkyl group.

7. A composition comprising a fat and, as an antioxidant for said fat, 2,6-bis-(2-hydroxy-1-naphthylmethyl)-4-tert-butylphenol.

---

[1] Made by adding a paste consisting of 5 g. of starch, 5 g. of potassium iodide, and 50 ml. of water to 450 ml. of boiling water, and cooling the solution to room temperature.

8. A composition comprising a fat and, as an antioxidant for said fat, 2,6-bis-(2-hydroxy-1-naphthylmethyl)-4-methylphenol.

9. A method of protecting a composition comprising a fat from oxidation comprising incorporating therein a 2,6-bis-(2-hydroxy-1-naphthylmethyl)-4-alkylphenol, in which the alkyl group contains not more than 20 carbon atoms.

10. A method of protecting a composition comprising a fat from oxidation comprising incorporating therein a 2,6-bis-(2-hydroxy-1-naphthylmethyl)-4-alkylphenol, in which the alkyl group is a lower alkyl group.

11. A method of protecting a composition comprising a fat from oxidation comprising incorporating therein 2,6-bis-(2-hydroxy-1-naphthylmethyl)-4-tert-butylphenol.

12. A method of protecting a composition comprising a fat from oxidation comprising incorporating therein 2,6-bis-(2-hydroxy-1-naphthylmethyl)-4-methylphenol.

References Cited in the file of this patent

UNITED STATES PATENTS

| | | |
|---|---|---|
| 2,314,364 | Musher | Mar. 23, 1943 |
| 2,849,325 | Lincoln | Aug. 26, 1958 |